Gerald Moss Inventor

FIG. 9.
MAGNESIA (RESIDENCE TIME)

FIG. 10.
MAGNESIA (DUST LOSSES)

United States Patent Office 3,784,676
Patented Jan. 8, 1974

3,784,676
REMOVING SULPHUR FROM HYDROCARBONS
Gerald Moss, Oxford, England, assignor to Esso Research and Engineering Company
Original application June 5, 1968, Ser. No. 734,816, now abandoned. Divided and this application Apr. 30, 1971, Ser. No. 138,883
Int. Cl. C01b *17/60*
U.S. Cl. 423—242              10 Claims

ABSTRACT OF THE DISCLOSURE

Production of an $SO_2$ free gas by oxidation of sulfur containing materials in a fluidized bed of calcium or magnesium oxide with regeneration of the oxides from sulfates formed in the oxidation.

CROSS-REFERENCE TO RELATED APPLICATION

This application is a division of my copending application Ser. No. 734,816, filed June 5, 1968, now abandoned.

This invention relates to the removal of sulphur and other impurities from gaseous, liquid or solid hydrocarbon fuels. The invention employs a fluidized bed, and, in a preferred form it utilizes a fluidized bed boiler. Fluidized bed boilers have the advantage of improved heat transfer between the source of heat and the object to be heated, e.g. the refractory walls of the boiler and/or the boiler tubes, for instance, in a boiler for heating water or steam for generating power. The higher and more uniform heat transfer rates obtained in these boilers permits the use of smaller and more compact boilers for a given energy output. Materials hitherto used in the fluidized bed have included coal, ash, sand and refractory materials.

Hydrocarbon fuels, e.g. fuel oils or coals, and fuel gases, e.g. gases produced in gasifier or natural gas, generally contain sulphur and/or sulphur compounds, hereinafter referred to generally in the specification and appendent claims as sulphur, and other impurities which e.g. with materials such as vanadium and sodium give rise to corrosion problems and also pollute the atmosphere; because of this, attention has been given to purifying the fuels before use, to reduce the amount of these undesirable impurities.

It is an object of the present invention to remove a high proportion of the sulphur and other undesirable impurities, especially vanadium compounds, by chemical reaction with fluidized bed material, e.g. in a fluidized bed boiler, by selecting fluidized bed material that will react chemically with impurities contained in a hydrocarbon fuel, e.g. a fuel oil or coal, to produce solid compounds with them so that the resultant flue gases have a substantially reduced content of, particularly, sulphur compounds and of other undesirable impurities, such as vanadium. Dependent upon the choice of fluidizing bed material, and conditions of operation, the above-mentioned solid compounds may be formed either under oxidizing or reducing conditions.

Preferably a further reaction is performed whereby sulphur is liberated from the aforesaid solid compounds and recovered, the fluidized bed material being regenerated. It is therefore within the ambit of the invention to absorb sulphur under oxidizing conditoins and recover it under reducing conditions or the converse.

Examples of suitable fluidized bed material are oxides of calcium magnesium and iron.

In a preferred form of the invention, the fluidized bed comprises, or contains initially, a heat decomposable metallic compound of a type, giving rise, on decomposition, to a gas and a metallic oxide, such as a metallic carbonate, or mixture of carbonates, which metallic oxide or oxides react with sulphur oxides formed during combustion of the fuel, and preferably also combining with other impurities present, especially vanadium compounds, to form solid compounds containing sulphur, e.g. sulphates or sulphides, depending on the process conditions and also solid compounds of other, e.g. vanadium, impurities. These compounds may be removed, continuously or intermittently, from the fluidized bed and replaced with fresh fluidized bed material; however, as previously stated, it is preferred to regenerate the sulphur reactive metal oxides by further reaction in a regeneration zone of the fluidized bed boiler to remove sulphur containing gases from the metal sulphur compounds. It has been found that, if heat decomposable metallic compounds such as calcium and magnesium carbonates are heated beyond a given temperature the resulting oxides pass from the so-called active conditions to an inactive condition and care must be taken to ensure that these materials are not heated to a temperature that causes them to become completely inactive.

It will be seen that sulphates form in the fluidized bed reaction in the presence of sulphur impurities under oxidizing conditions.

Sulphur may be regenerated from the solid sulphates, whether originally present or formed in the fluidized bed reactions: the sulphate can be decomposed, particularly in the presence of low concentrations of CO, e.g. around 4% at temperatures in the region of 950° C., preferably in an atmosphere of combustion products, with liberation of sulphur dioxide which, in a reducing atmosphere, is reduced to produce elemental sulphur; the regenerated material may be reused to absorb further amounts of sulphur. The yield of sulphur can be increased in the presence of suitable catalysts, e.g., bauxite, suitably at temperatures in the region of 250° C.

The invention is readily applicable to hydrocarbon fuels, e.g. fuel oils or coal, and fuel gases. The preferred carbonates are those of calcium, or magnesium, or mixtures of these, suitably the mineral dolomite and the invention is further described, by way of example, with reference to an oil-fired boiler provided with a fluidized bed of calcium or magnesium carbonate.

When a sulphur-containing hydrocarbon is burned under oxidizing conditons with air or oxygen the sulphur oxides formed during combustion react with the metallic oxides, preferably over a temperature range as hereinafter referred to, to form sulphates. If calcium carbonate is used as the fluidized bed material at temperatures between, e.g. 800° C. and 1100° C. (at atmospheric pressure) the carbonate will decompose and the residual active calcium oxide will react with sulphur oxides formed in the combustion of the fuel which may be burned in or externally of the fluidized bed. Bed material containing the resulting calcium sulphate, if desired, may be continuously or intermittently removed and the combined sulphur oxide may be released in a separate regenerator after which it may be reduced to elemental sulphur or otherwise processed, e.g. used to make sulphuric acid. Both calcium and magnesium react with vanadium thus reducing the likelihood of high temperature corrosion when vanadium is present in the fuel. Since both calcium oxide and magnesium oxide are useful materials for the fluidized bed it may be economically advantageous to use lime, limestone, dolomite or calcium sulphate as the make-up material for the fluidized bed.

It is important that the temperature in the regeneration stage does not exceed that at which the bed material tends to become refractory and hence inactive.

In order to maintain the activity of the fluidized bed it is necessary to remove, on a continuous or intermittent basis, some of the solid sulphite formed in the fluidized bed, if a further reaction to remove sulphur is not carried out, and this is replaced with fresh metallic compound, e.g. calcium carbonate or oxide or it may be replenished at least in part, by material removed from the fluidized bed and regenerated by heating, i.e. to about 1000° C. in a mildly reducing atmosphere, to remove the sulphur oxides. The regeneratory step, if desired, may be carried out on a continuous basis preferably in a separate regenerator in circuit with the boiler and arranged for circulation of fluidized bed material between the boiler and the regenerator.

The regeneration step is advantageous in that it provides a means for converting a nuisance impurity into a useful product. Furthermore the regeneratory step can be employed to further advantage by returning the high temperature regenerated oxide to the boiler thus improving the thermal economy of the process.

As previously mentioned, by a further reaction of the $SO_2$ produced during regeneration, elemental sulphur may be produced and recovered. Whilst it is preferred to carry out regeneration in a separate fluidized bed, the bed material may be regenerated within the bed, e.g. it may be drawn through a standpipe within the oxidizing bed and caused to cascade from the top of the pipe back to the main bed by means of a gas circulation induced, for example, by a blower. Air drawn in with the bed material entering the base of the stand pipe can be used for the partial combustion of fuel oil injected within the stand pipe and a reducing atmosphere may be maintained within the circulating system; excess gas may be burned in the oxidizing bed. In the course of this operation sulphur dioxide is released and is reduced to produce sulphur and the gases leaving the top of the stand pipe contain sulphur vapor as well as sulphur dioxide and other sulphur compounds. By inserting a cooling condenser operating at an appropriate temperature, e.g. a steam cooled condenser operating at a temperature in the range of 120–350° C., preferably 150–300° C., in the gas circulating system, the sulphur can be condensed and recovered as liquid sulphur; unreacted sulphur dioxide and other sulphur compounds may be returned in part to the stand pipe for the prodction of further amounts of sulphur but the bulk of the gas passing through the sulphur condenser will subsequently be vented to the oxidizing bed where the sulphur which it contains will recombine with the bed material. If desired a catalyst may be provided to catalyse the reduction of the sulphur containing gases to sulphur; for example, a packed bed of bauxite may be placed in the line leading to the sulphur condenser.

The absorption stage of sulphur removal has been previously described primarily with reference to absorption under oxidizing conditions but sulphur removal may also be achieved by operating under reducing conditions in which sulphur is absorbed as metallic sulphide using appropriate metal compounds and regenerated by an oxidation reaction. For example it has been found that lime will absorb sulphur from $SO_2$ in an atmosphere of town gas at a temperature of 1000° C. to form CaS and that a substantial proportion of the sulphur so absorbed may be stripped off as $SO_2$ by a stream of air at this temperature, the remaining sulphide being converted to sulphate; another suitable metal compound is iron oxide.

Thus, if the fluidized bed material comprises, or contains calcium oxide it is readily converted to calcium sulphide by the sulphur present in the hydrocarbon fuel under reducing conditions; by subjecting the thus formed calcium sulphide to oxidizing conditions calcium oxide is regenerated and sulphur liberated as sulphur dioxide which may, in turn, be reduced to produce sulphur. In this case the fluidized bed desulphurizer may be an adjunct to a boiler and the fuel may eitherbe burned substoichiometrically in a fluidizer or grasified externally of the fluidized bed and the gases led into the bed. When this is done the gases leaving the bed will be substantially freed from sulphur and the burning of the gases completed in another apparatus, e.g. a boiler, a lime kiln or a turbine combustion chamber. The fluidized desulphurizer may contain its own regenerating equipment in this case. In this form of the invention it is desirable to retain the bed material within the casing of the desulphurizer by means of suitable equipment such as cyclones.

In a preferred form, regeneration may be carried out within the barrel of the cyclone by passing a stream of air, vertically, counter-current to the flow of solids and educting the resulting $SO_2$ rich gas in a hooded pipe axially located in the barrel of the cyclone.

Fluidization may be carried out in two stages and in two fluidizing beds which may be located one above the other. The lower bed is operated under conditions, suitably at a temperature above 900° C. and under these conditions the sulphur contained in the fuel reacts with e.g. the calcium oxide bed material to form calcium sulphide. Desulphurized gas leaving the lower bed enters the upper bed where more air is introduced and combustion is completed, preferably at the lowest suitable temperature; the gases may then be passed to an economizer and an air heater. Where recovery of the combined sulphur is desired, a regenerating unit, suitably located near the fluidized bed boiler, and containing two beds, one above the other, may be employed; arrangements are made for bed material to be exchanged between the lower bed of the boiler and the lower bed of the regenerator which latter is operated under oxidizing conditions so that calcium sulphide formed in the boiler is transferred to the regenerator and regenerated calcium oxide is transferred to the boiler. Under the oxidizing conditions in the lower bed of the regenerator, sulphur dioxide is evolved and passed to the upper bed of the regenerator. The upper bed of the regenerator is operated under reducing conditions, e.g. by introducing reducing gas from the boiler and, preferably, contains a sulphur reducing catalyst, e.g. alumina. The regenerator, preferably, also contains heat exchanger tubes forming part of the boiler circuit in order to reduce the temperature, e.g. to around 300° C. The gas leaving the upper bed of the regenerator contains sulphur vapor and passes through a sulphur condenser where its temperature is appropriately lowered to condense the sulphur, e.g. to 150° C. and the sulphur removed. The remaining gas phase is returned, aided by a fan or blower, to the lower bed of the boiler where any remaining sulphur is recombined with the calcium present.

In a further embodiment regenerated lime from the bottom regenerator bed is transferred to the top bed of the boiler in order to absorb sulphur under oxidizing conditions. It is subsequently allowed to overflow into the bottom reducing bed so that two stages of sulphur pick-up are available, and the lime circulates around a three bed circuit.

In the treatment of solid hydrocarbon fuels, e.g. coals, which may contain a large proportion of ash, e.g. 20% by weight or more, means must be provided for removing ash from the process without a substantial loss of fluidized bed material, e.g. lime. It has been found that coal containing at least 24% by weight of dolomite can be burned in a fluidized bed at temperatures up to 945° C. without sintering and at temperatures below this, e.g. in the region of 815° C., coal ash particles will not tend to adhere to particles constituting the fluidized bed. It is preferred, therefore, that coal to be buried in a fluidized bed is sized so that its ash partciles are substantially smaller than those of the fluidized bed material; suitable means, e.g. a low efficiency cyclone may be used to retain the fluidized bed particles within the combustion chamber whilst allowing the ash particles to escape and these may be removed from the flue gas by known means. The coal may be introduced to the fluidized bed, or beds, in known manner, for example by pneumatic transport, or a mixture of coal and liquid hydrocarbon may be used, e.g. as a coal/oil slurry.

Although the gasification of sulphur containing fuels in a fluidized bed boiler has been specifically mentioned, the fuels may be handled in other ways, e.g. by first gasifying them in a gasifier. Fuel oil gasifiers are commonly used to supply a fuel gas where combustible components consist mainly of CO, $H_2$ and some unburned hydrocarbon, to a variety of industrial processes such as lime burning and metal treatment.

In these gasifiers, the fuel is burned in about 20–40% of its stoichiometric air requirement, and the resulting fuel gas is produced at temperatures ranging between 900° and 1200° C. The temperature is controlled by varying the amount of air used for combustion, and by the addition of water or steam to the effluent gas. In addition, temperature control can be achieved as in the case of British Patent No. 1,114,330 and corresponding U.S. Pat. No. 3,480,419, by recycling about 60% of the gas. Both water addition and gas recycle help to cut down the quantity of soot in the fuel gas.

In most instances where gasifiers are used, the fuel gas is fed hot to its point of application in order to conserve heat, but for some applications the gas is cleaned and stored cold before use.

The effluent gas from a gasifier contains much of the fuel sulphur in the form of hydrogen sulphide, together with sulphur dioxide, and since these materials are harmful to many processes, it is advantageous to remove them. The present invention is applicable to sulphur removed for these purposes.

Thus, for example, the fuel gas from a gasifier, preferably at a temperature of less than 1000° C. is fed to a sulphur absorption unit containing a fluidized bed as hereinbefore referred to, e.g. of a suitable particle size distribution. At a high partial pressure of CO and comparatively low temperature, most of the sulphur in the gas will be combined in the form of sulphide, e.g. CaS. Simple laboratory experiments have shown this reaction to be rapid, and the residence time of the gas in the bed is short.

The spent reagent, consisting of about ⅔ lime and ⅓ CaS, is removed from the absorption bed to a second fluidized bed, where it is treated with air. At the temperature of the bed this treatment results in oxidation of the CaS, releasing the bulk of the sulphur as a concentrated $SO_2$ stream, but also forming some sulphate. This reaction is exothermic, and it may be desirable, in some cases, to control the temperature of this second bed by employing an excess of air, and/or by the use of added fluidized bed material, e.g. limestone, which will absorb excess heat as it is calcined. The regenerated material may be recycled to the absorption bed by means of a transfer line. In another form of the invention, the oxidation bed is discarded, and the material regenerated in a transfer line which takes it from the bottom of the absorption reacter and recycles it again to the top. Finally, in some applications a plentiful supply of low cost $CaCO_3$ may be available, or a use may be found for the spent reagent. In such cases, screened carbonate may be fed to the reactor, at a rate equal to about 40 kg. of $CaCO_3$ per barrel of 3% sulphur fuel oil. Provided the fuel gas is kept at a temperature of about 1000° C. it will contain sufficient sensible heat to calcine the stone, which will then be able to absorb sulphur. Even though the spent material is to be discarded, or put to another use, it will still be necessary to treat it in an oxidizing bed, since lime containing sulphide is liable to envolve $H_2S$ on exposure to the damp.

For all of these applications, the $SO_2$ in the gas stream leaving the oxidizing bed may be recovered and used in a number of conventional methods, or for low volume applications where no problem of atmospheric pollution exist, the gas may merely be vented to atmosphere. The foregoing description refers to a reduction/oxidation system but, as previously described, an oxidation/reduction system may be used.

A sulphur eliminating gasifier system such as those described above may be applied to any industrial process where a sulphur free fuel gas is required. For example, it may be used in the manufacture of pure $CO_2$ from petroleum, and in the metallurgical, glass, and ceramic industries.

It will be apparent that various combinations of liquid and solid hydrocarbon fuels may be used in the process of the invention. Thus, for example, coal or oil may be burned in an oxidizing bed of the boiler and coal/oil slurry, coal, oil, or gas in a regenerator.

A number of experiments have been conducted to investigate various parameters relevant to the invention. These experiments were carried out to investigate the effect of varying temperature, oxygen content of the gases, sulphur loading in the gases and residence time, on the removal of $SO_2$ by MgO and CaO. The MgO used was commercially available lightly calcined magnesia whereas the CaO was limestone calcined in situ at 900° C. The experiments indicated that CaO is preferable to MgO as a bed material being less sensitive temperature, oxygen content and sulphur loading of the combustion gases and because of its superior reactivity.

The invention is further illustrated by reference to the accompanying drawings in which FI. 1 is a schematic sectional representation of one form of the invention.

Figure 1:
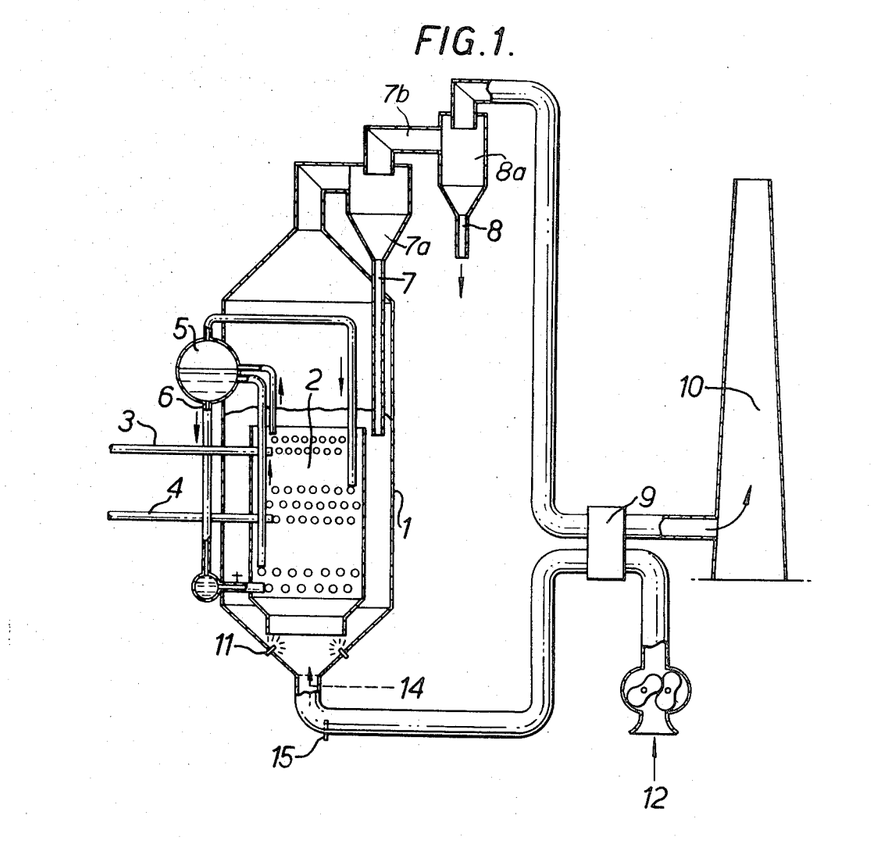

Referring particularly to FIG. 1 of the drawings the unit illustrated, which is by way of example only, comprises a metal combustion chamber 1, lined with, for example, refractroy bricks, containing a bed of particles 2, which is fluidized by the burning fuel/air mixture, fuel being introduced suitably through an oil spray 11 and combustion air through an air intake 12. A grid 14 is suitably provided at the bottom of the fluidized bed and 20 an auxiliary burner 15 may also be supplied. The bed contains oxides and/or carbonates of magnesium and/or calcium of particle size within the range used in fluidized beds.

Combustion air and oil are introduced at the bottom of the combustion chamber and burn in the fluidized bed 2 from which the heat of combustion is extracted by several layers of tubes 3 and 4, carrying water and steam respectively. The fluidization velocity with this kind of bed, irrespective of its dimension is between 0.4 to 10 ft. per second, and the bed may be operated with a fluidization velocity of, for example, between 0.8 and 2.5 ft. per second.

The combustion products pass upwards out of the fluidized bed through a primary cyclone 7a, in which coarse particles carried over are separated out and returned to the bed through a pipe 7. The combustion products pass through a pipe 76 to a second cyclone 8a for removal of fines at 8 the gas being then passed through an air preheater 9 to a flue 10.

Figure 2:
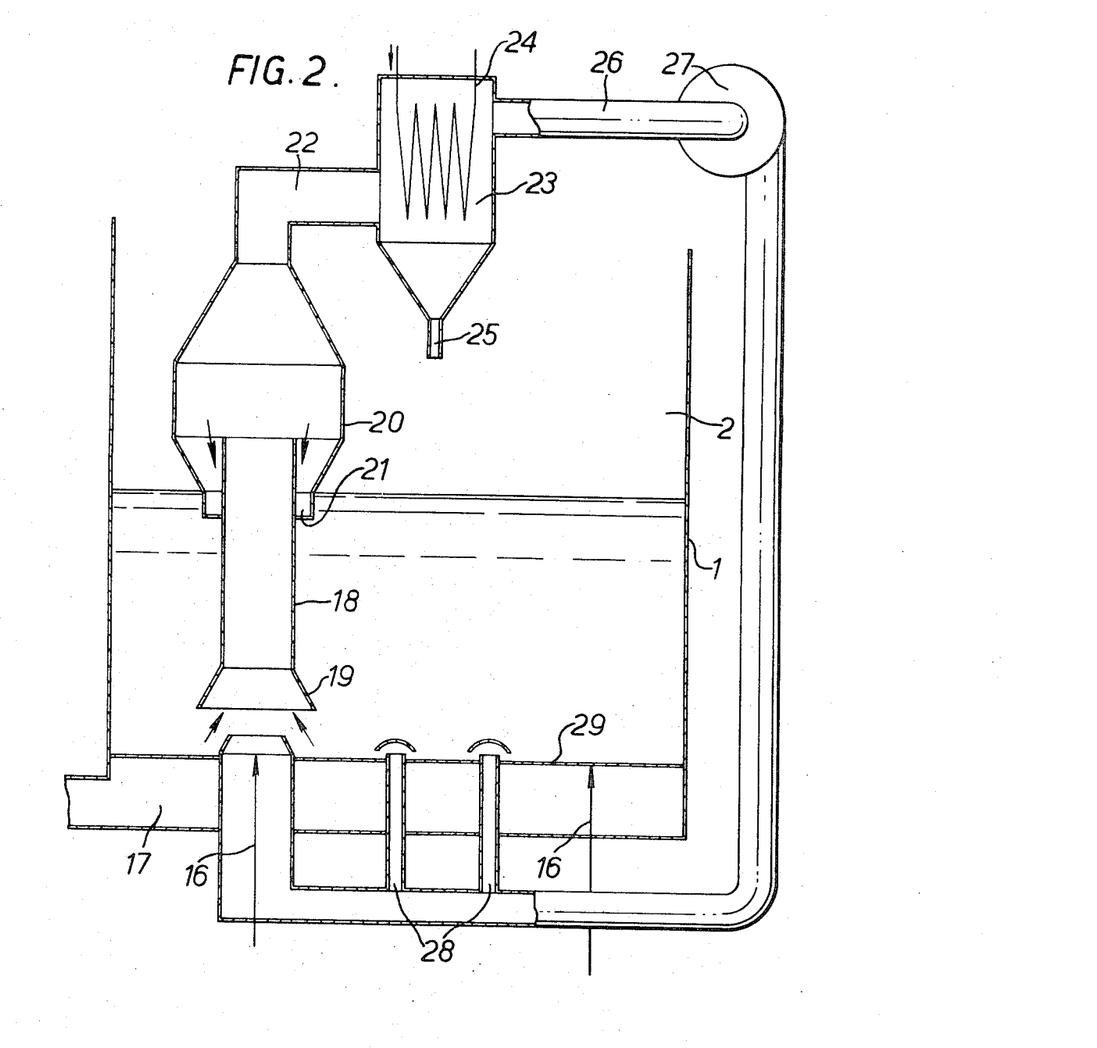
FIG. 2 is a schematic representation of a modification of the invention.

Referring now to FIG. 2 of the drawings, there is provided as in the form of the invention shown in FIG. 1, a combustion chamber 1 containing a bed 2 of particles of magnesium and/or calcium oxides and/or carbonates fluidised by a burning mixture of fuel, supplied at 16 and air supplied through an air intake 17. Within the fluidized bed is a standpipe 18, flared as shown at 19 and provided with a dedusting hood 20, spaced from the standpipe as shown at 21. A conduit 22 leads from the hood 20 to a condenser 23 provided with a condenser coil 24 and a condensate outlet 25. A conduit 26 leads from the condenser 23, via a blower 27 and returns, through vents 28, to the fluidised bed 2. 29 is a distributer.

In operation of the invention, as examplified in FIG. 2, fluidized bed material 2 is drawn into the flared base 19 of the standpipe 18 and caused to cascade from the top of the pipe 18, through the space 21, back to the main fluidized bed 2 by means of a gas circulation induced by the blower 27. Air, drawn in with the material entering the base of the standpipe, is used to partially burn fuel oil injected within the pipe and reducing atmosphere is maintained within the circulating system, excess gas passing through the conduits 22 and 26 and returning to the fluidized bed 2 through the fuel gas vents 28. The temperature in the stand pipe is maintained above 750° C. and preferably within the range of 900–1000° C. whereby sulphur compounds extracted from the fuel oil by the metallic oxides of the fluidized bed, and converted to sulphates, are recovered in the standpipe as sulphur dioxide, through decomposition of the sulphates in the presence of carbon produced by the partial combustion of the fuel oil in the reducing atmosphere of the standpipe. The partial combustion of the fuel oil will result in the partial conversion of the sulphur that it contains to elemental sulphur. The sulphur vapor is entrained through conduit 22 to condenser 23 where it is condensed to liquid sulphur by the passage of a condensing fluid through condenser coil 24, and liquid sulphur recovered through the outlet 25. Unreacted gaseous sulphur compounds are recirculated and in part returned to the standpipe where further reduction to sulphur occurs. Since fuel and air are being added continuously to the system means must be provided for removing excess gas rich in cracked products and carbon monoxide as well as gaseous sulphur compounds. As shown in FIG. 2 this may be accomplished by circulating the gases through conduits 27 and 26, through vents 28 to the base of the fluidized bed 2 where oxidation of the gases is completed, the sulphur compounds being retained in and the bed material as sulphate.

Figure 3:
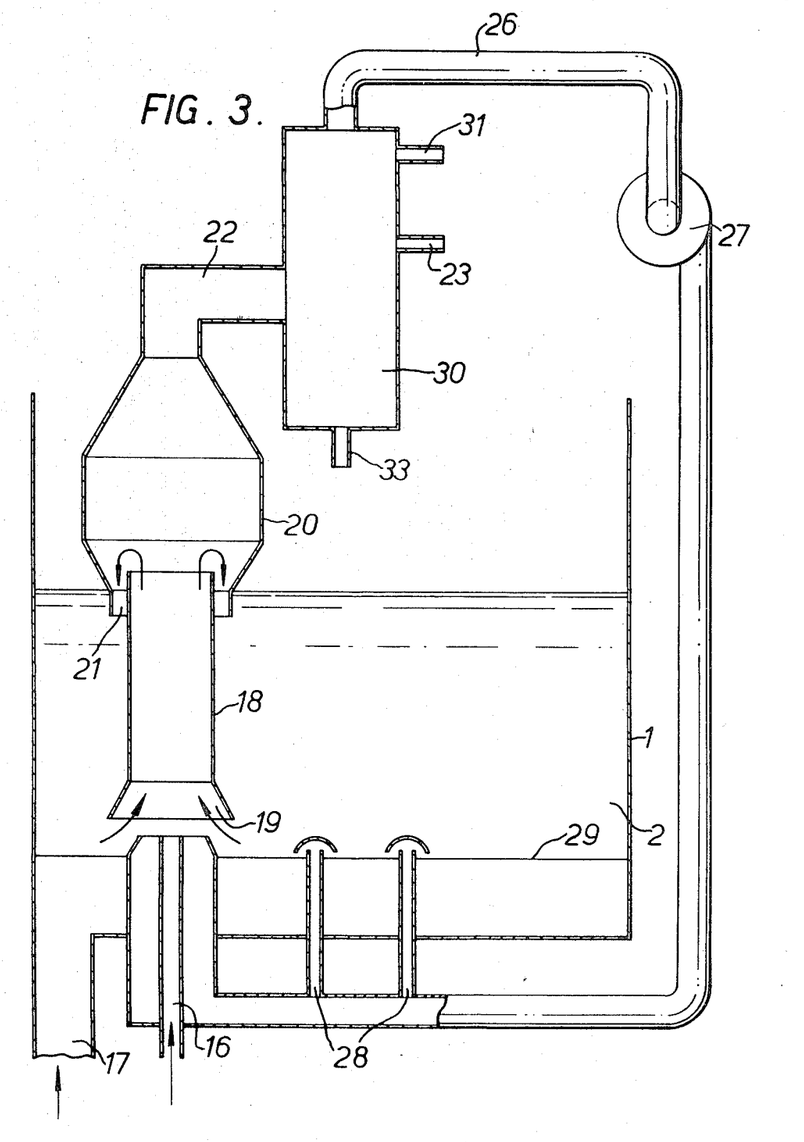
FIG. 3 is a schematic representation of a further modification.

FIG. 3 shows the combustion chamber 1, with its bed 2, fluidized by a burning mixture of fuel supplied at 16 and air supplied through air intake 17. As in the form of the invention shown in FIG. 2, there is provided a standpipe 18, flared at 19 and a de-dusting hood 20 spaced from the standpipe 18 as shown at 21. Overheads pass from the hood 20 to conduit 22 and thence to a fractionator 30 from which side streams are taken off at 31 and 32 and bottoms, containing tar and sulphur, through 33. Overhead gases pass from the fractionator through conduit 26, passing via blower 27 to the bottom of the fluidized bed 2 by way of fuel gas vents 28 which extend through the base 29 of reactor 1.

In this form of the invention all of the liquid fuel supply may be fed to the regenerator tube or tubes in which case the volume of fuel oil fed to the boiler exceeds the volume that is consumed in the boiler. As shown in the drawing, cracked and vaporized materials leaving the regenerator are fed to a fractionating column and non-condensible overheads are returned to the boiler circuit where they are consumed in the main bed together with carbon released during cracking. The tars in the bottom stream may be extracted from the sulphur and returned to the boiler for recycling. In this way fuel oil is upgraded into more valuable products whilst that portion of the fuel which is consumed is used to furnish process heat, sulphur being recovered as a by-product.

Figure 4:
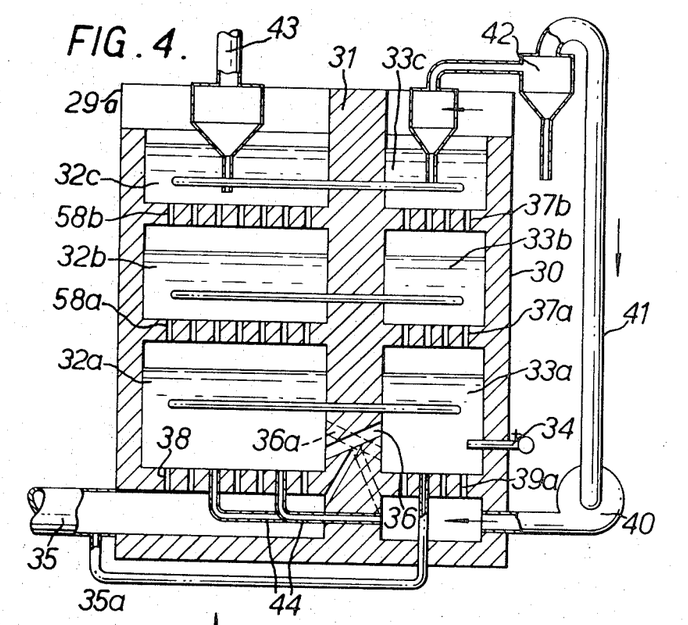
FIG. 4 is a schematic sectional representation of a fluidized bed boiler and regenerator and FIG. 5 is a schematic sectional representation of an alternative form of fluidized bed boiler and regenerator.

FIG. 4 shows a fluidized bed boiler 29a with a separate regenerator 30 separated from the boiler by a dividing wall 31. The boiler 29a is provided, in vertical sequence, with fluidized beds 32a, 32b and 32c, of which 32a is a combustion bed and 32b, 32c are heat recovery beds. The regenerator 30 is similarly provided, in vertical sequence, with fluidized beds 33a, 33b and 33c, of which 33a is a gasifying bed. 34 is a hydrocarbon fuel inlet and 35 is an air inlet, which may be provided with a branch pipe 35a to pass part of the introduced air into the gasifying bed 33a to partially combust fuel introduced at 34. 36 is a transfer port leading from the gasifying, and reducing, bed 33a to the combustion, and oxidizing, bed 32a. A similar port, indicated by the dotted lines 36a, lies beyond the port 36 and leads from the oxidizing bed 32a to the reducing bed 33a. The beds 32a, 32b and 32c are in communication through tubes 58a and 58b; similarly, the beds 33a, 33b and 33c are in communication tubes 37a and 37b. Air enters the combustion bed 32a through tubes 38 and reducing gases enter the gasifying bed 33a through tubes 39a. A recirculation blower 40 circulates gases from beds 33a, 33b and 33c through a recirculation line 41 in which is interposed a condenser 42 in which sulphur is condensed and removed. 43 is a flue. Recirculated reducing gases from line 41 enter combustion bed 32a through tubes 44.

In operation fuel is injected at 34 into gasifying bed 33a from whence it is recirculated through beds 33b and 33c and recirculation pipe 41 and delivered through pipes 44 to the combustion bed 32a where sulphur is extracted and combines with fluidized bed material in bed 32a. There is a continuous movement of fluidized bed material between beds 32a and 33a via ports 36 and 36a so that fluidized bed material which has combined with sulphur in bed 32a to form, e.g. $MgSO_4$, is continuously transferred to bed 33a where it is reduced and regenerated to MgO which in turn, is returned to bed 32a for further reaction. The reducing reaction, that occurs in bed 33a, liberates sulphur vapor and gaseous sulphur compounds. The sulphur vapor is condensed in the condenser 42 and removed from the system whilst gaseous sulphur compounds are returned to beds 32a and 33a for further reaction in which further amounts of sulphur are produced and recovered.

Figure 5:
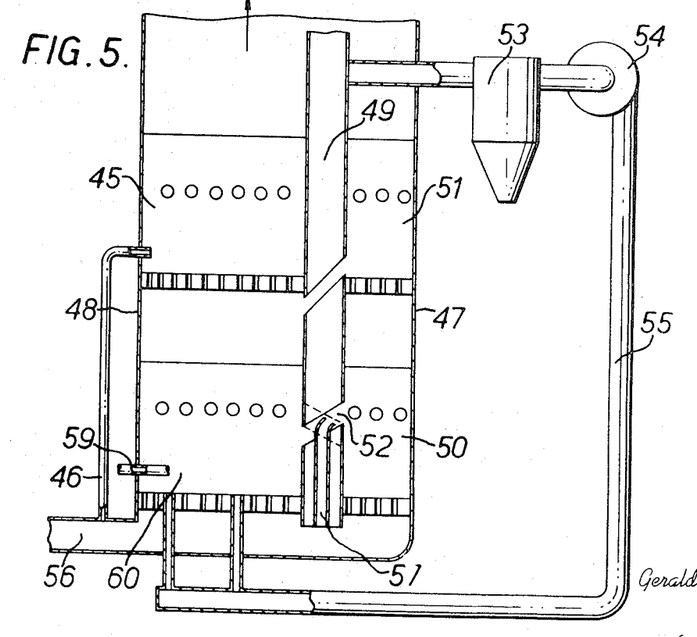

The form of the invention shown in FIG. 5 illustrates means suitable for use in the case where sulphur is combined with fluidized bed material in a reducing bed and liberated in an oxidizing bed, e.g. where a material such as iron oxide constitutes the fluidized bed material. This is the reverse of the operation described with reference to FIG. 4 in which the sulphur compound is formed in an oxidizing reaction and sulphur recovered in a reducing reaction.

Referring to FIG. 5, it will be seen that combustion of fuel, introduced through inlet 59, is carried out in two stages, in the boiler 48 firstly in a lower reducing fluidized bed 60, wherein fluidized bed material, e.g. iron oxide, reacts with sulphur contained in the introduced fuel to form iron sulphide, e.g. when operated at a temperature above 900° C. in the presence of reducing gases. Sulphur-free fuel gas passes from the bed 60 to an upper bed 45 where additional air is introduced through pipe 46 and combustion is completed, e.g. at 600° C., the gases then passing to an economizer and heater. A regeneration unit 47, separated from the boiler 48 by a dividing wall 49 has a lower regenerating bed 50, operating under oxidizing conditions, and an upper reducing bed 51. There is a continuous movement of fluidized bed material between the beds 60 and 50 via ports such as 52 whereby, e.g. iron sulphide, produced in bed 60 is transferred to bed 50, regenerated, and returned to bed 60. Sulphur dioxide is liberated in bed 50 passes to bed 51 where, under the reducing conditions of this bed, sulphur is formed and is condensed, and removed, in condenser 53. Unreduced sulphur dioxide, and other gases, are circulated, under the influence of a blower 54, through pipe 55 to the reducing bed 60. Air is introduced into bed 50 through conduits 56 and 57.

As previously mentioned, experiments have been carried out to investigate the effect of varying relevant parameters on the removal of sulphur from hydrocarbon fuels. The results of these experiments are shown in the following tables and interpreted in the accompanying drawings.

Some explanation of the apparatus used and the experiments carried out is necessary. Firstly, the fuel was burned outside the bed vessel and the combustion gases were drawn through it. This situation is different from the batch fluidizer where the fuel is burned in the actual bed. Secondly, the experiments were designed to determine the effect of the variables; temperature, oxygen content of the gases, sulphur loading in the gases and residence time, on the removal of $SO_2$ by magnesia and lime. Thirdly, commercially available lightly calcined magnesia was used whereas limestone was calcined in situ at 900° C. to provide the lime for each experiment.

The following is a brief explanation of the tables and diagrams.

Removal Efficiency $$= \frac{\text{Wt. of } SO_2 \text{ leaving bed/litre of gas}}{\text{Wt. of } SO_2 \text{ entering bed/litre of gas}}$$

MAGNESIA

Figure 9:
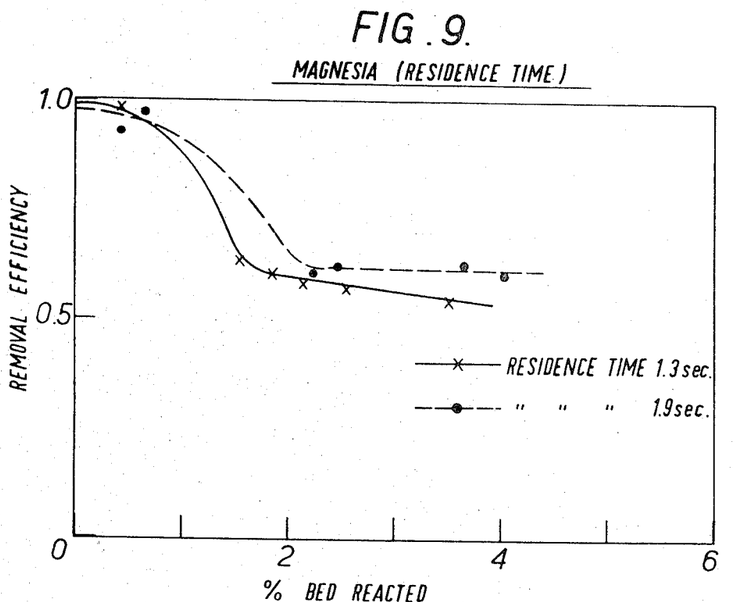
FIG. 9 is a graph showing the effect of residence time in a bed of MgO.
Figure 10:
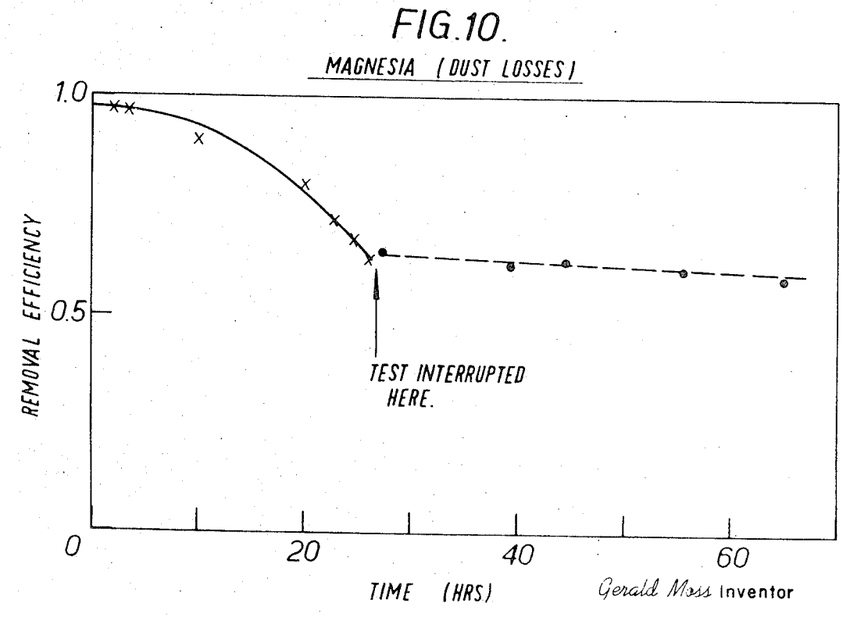
FIG. 10 is a graph relating dust losses to time in a bed of MgO.

Dust losses—Curves of the type shown in FIG. 9 were obtained when tests were carried out with all variables constant throughout. These showed that the initial removal efficiency was high (90%) but fell off sharply to a "steady state" level. By interrupting a test at the beginning of the steady state level (FIG. 10) and calculating dust losses for both parts, high dust losses were found to be related to the initial high removal efficiency (Table IV). Thus this initial high removal efficiency could be due to fine particles.

Figure 6:
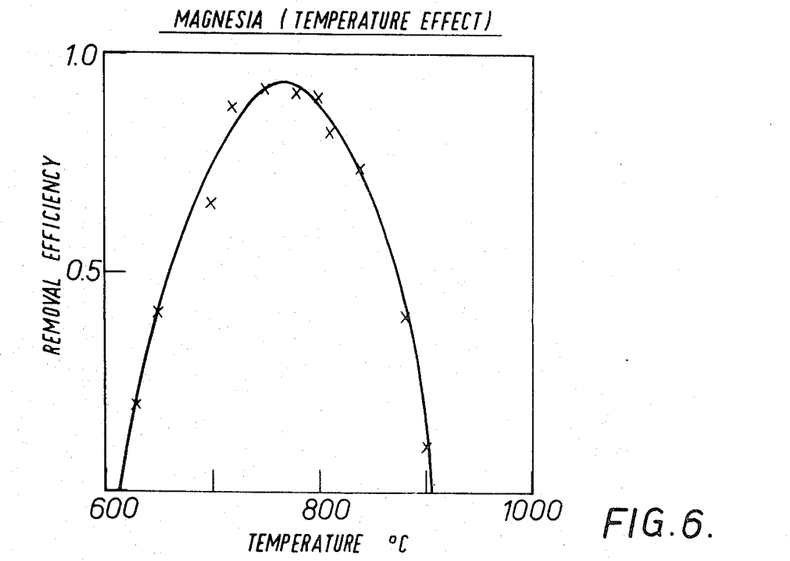
FIG. 6 is a graph showing the effect of temperature on a fluidized bed of magnesium oxide.

Temperature—The optimum temperature is between 750 and 800° C. (FIG. 6).

Figure 7:
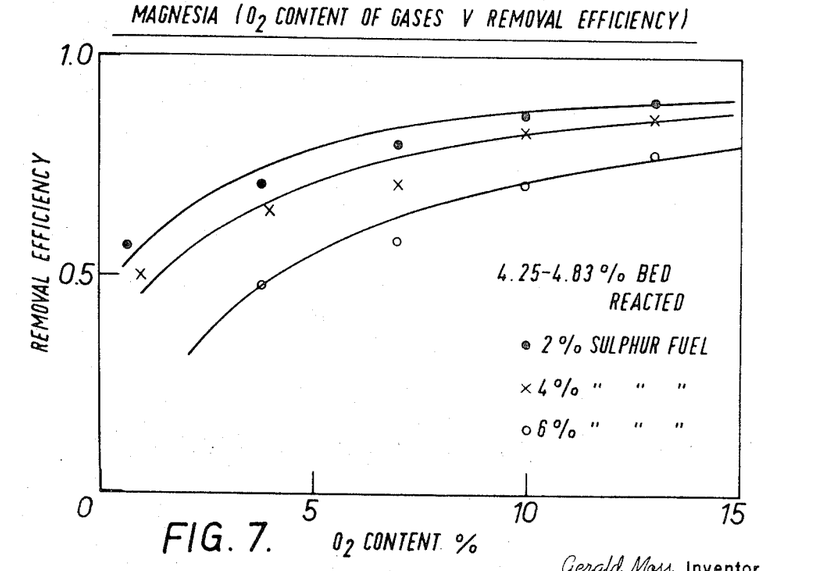
FIG. 7 is a graph showing the effect of oxygen content of gases on $SO_2$ removal efficiency in a fluidized bed of magnesium oxide.
Figure 8:
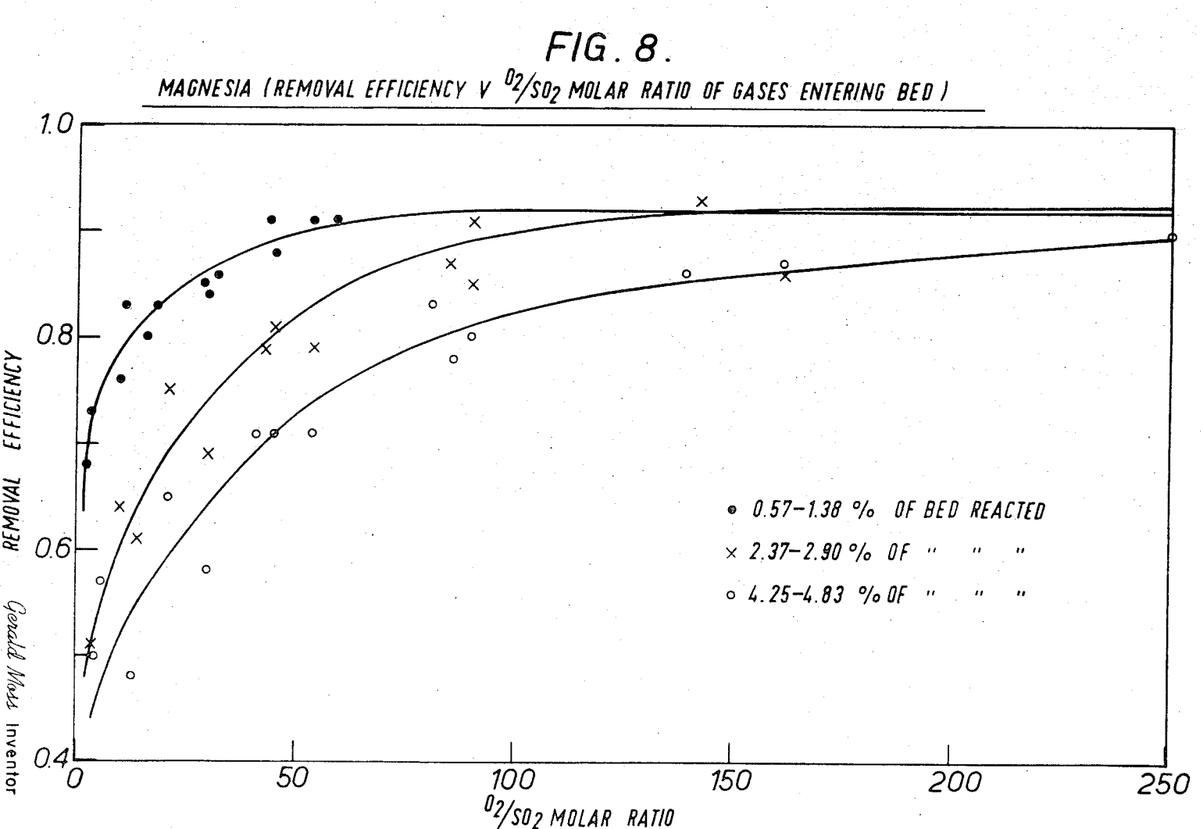
FIG. 8 is a graph showing the effect of $O_2/SO_2$ molar ratio on removal efficiency in a bed of MgO.

Oxygen content—FIG. 7 shows how removal efficiency varies with oxygen content but for a given amount of bed reacted removal efficiency really depends on the initial $O_2/SO_2$ molar ratio (FIG. 8).

Gas residence time—FIG. 9 shows that residence time appears to have little effect, i.e. within the range examined.

LIME

Figure 11:
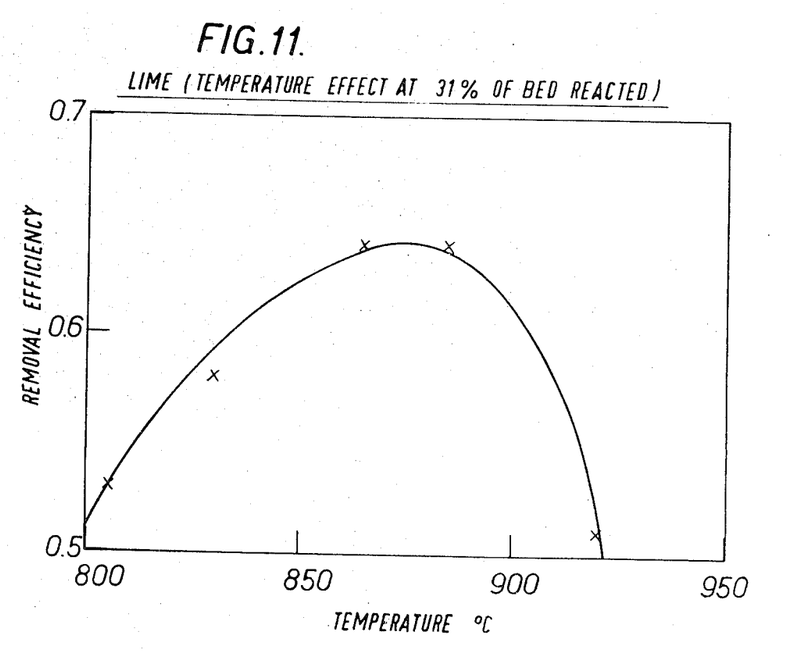
FIG. 11 is a graph relating temperature to degree of reaction in a bed of lime.

Temperature—Table V shows that variations in temperature between 800 and 925° C. have no effect initially but at greater amounts of bed reacted the optimum temperature appears to be in the region of 865° C. (FIG. 11).

Figure 12:
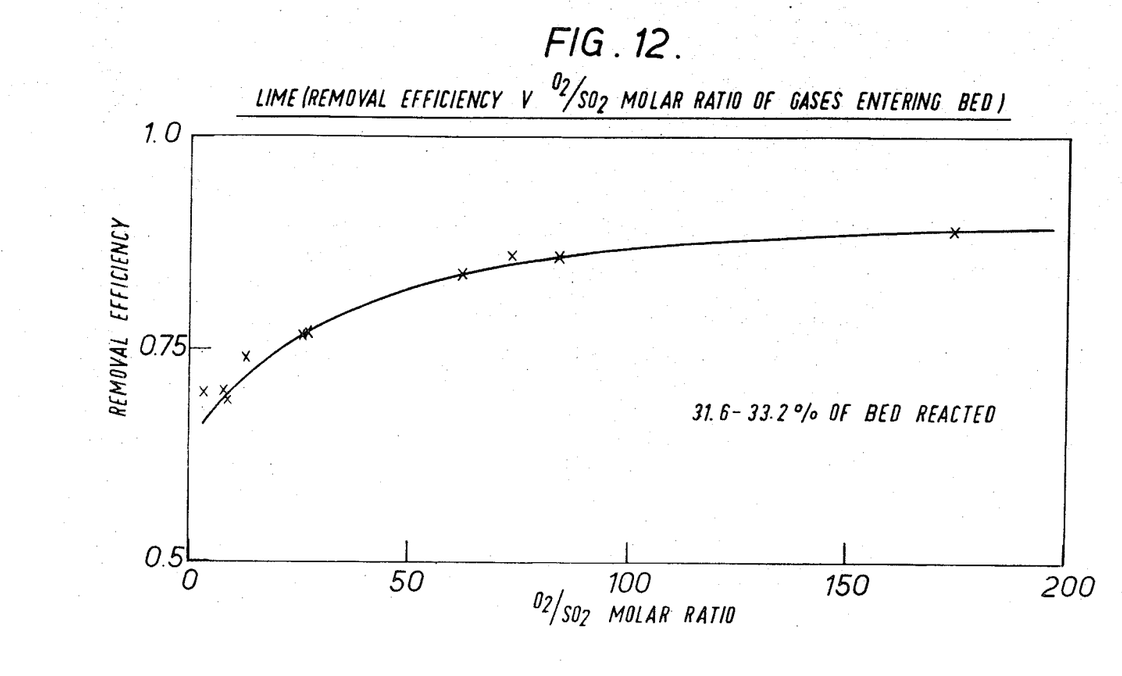
FIG. 12 is a graph showing the effect of $O_2/SO_2$ molar ratio on removal efficiency in a bed of lime.
Figure 13:
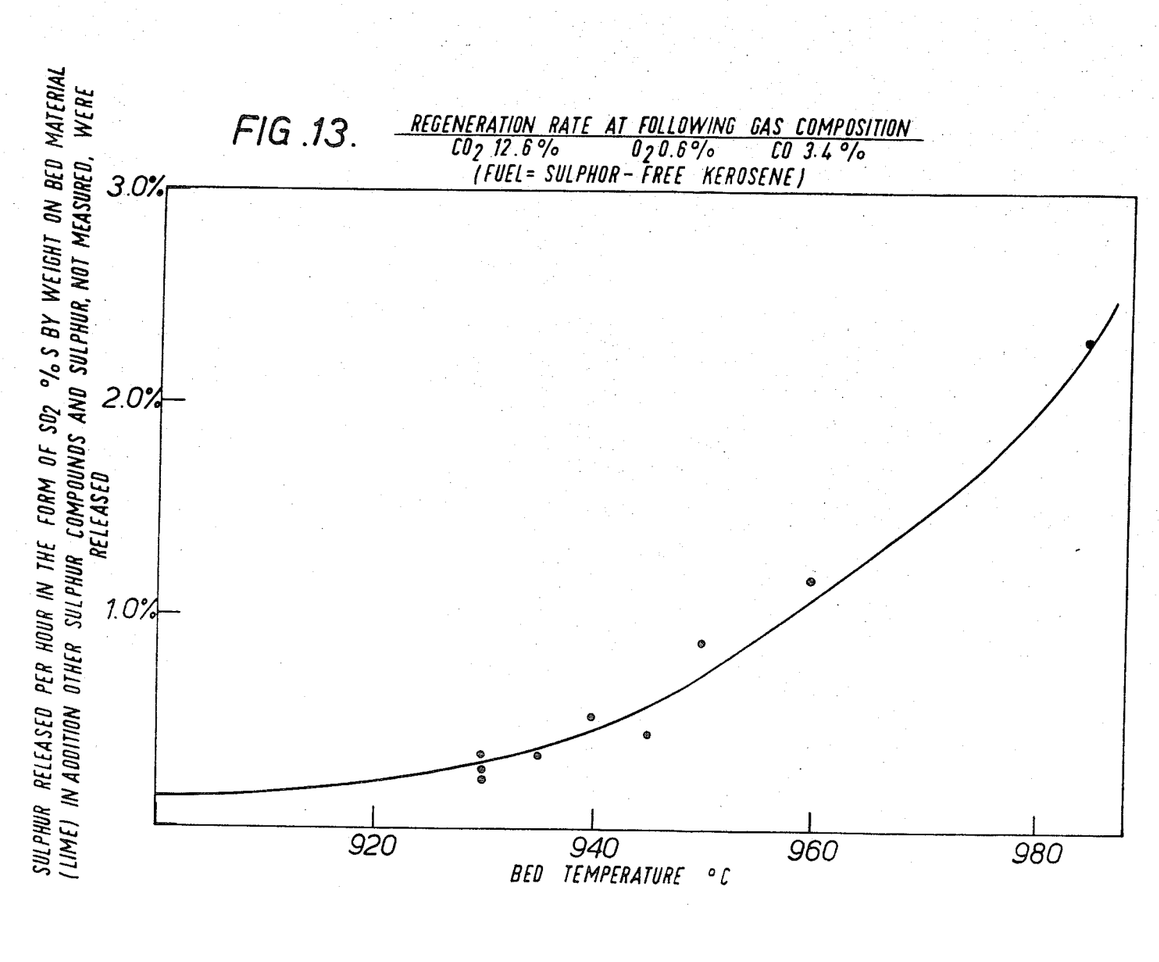
FIG. 13 is a graph showing regeneration rate at indicated gas compositions.

Oxygen content and sulphur loading of gases—Table VI shows that variations in $O_2$ content and sulphur loading of the gases have no effect initially but at greater amounts of bed reacted removal efficiency again becomes dependent on $O_2/SO_2$ molar ratio as with magnesia (FIG. 12).

MAGNESIA

Table I

The effect of temperature (at 2.5% of bed reacted)

| T° C. | Percent removal efficiency |
|---|---|
| 630 | 20 |
| 650 | 41 |
| 700 | 66 |
| 720 | 88 |
| 750 | 92 |
| 780 | 91 |
| 800 | 90 |
| 810 | 82 |
| 840 | 74 |
| 880 | 40 |
| 900 | 10 |

Values of other variables during this test:

| | |
|---|---|
| Oxygen _________________________percent__ | 6 to 7 |
| Particle size ____________________________μ__ | 104–211 |
| Residence time ________________________sec__ | 1.9 |
| Fuel sulphur ____________percent by wt.__ | 4.0 |

TABLE II.—OXYGEN CONTENT AND SULPHUR LOADING OF GASES

A

| Fuel sulphur, percent by wt. | $O_2$ content of gases entering the fluidized bed (percent by vol.) | Removal efficiency, percent | $O_2/SO_2$ molar ratio | Percent bed reacted |
|---|---|---|---|---|
| 4 | 6.9 | 91 | 44.3 | 0.57 |
| 4 | 5.1 | 85 | 29.2 | ↓ |
| 4 | 3.1 | 80 | 16.0 | ↓ |
| 4 | 0.8 | 73 | 3.5 | 0.76 |
| 2 | 7.0 | 91 | 90.0 | ↓ |
| 2 | 4.8 | 91 | 54.0 | ↓ |
| 2 | 3.1 | 86 | 31.9 | ↓ |
| 2 | 1.1 | 83 | 10.6 | ↓ |
| 2 | 5.1 | 91 | 58.5 | 1.01 |
| 6 | 7.0 | 84 | 30.1 | ↓ |
| 6 | 4.8 | 83 | 17.7 | ↓ |
| 6 | 3.0 | 76 | 10.6 | ↓ |
| 6 | 0.8 | 68 | 2.5 | ↓ |
| 6 | 9.1 | 88 | 45.2 | 1.01 |

B

| | | | | |
|---|---|---|---|---|
| 4 | 7.0 | 81 | 45.2 | 2.37 |
| 4 | 4.0 | 75 | 21.1 | ↓ |
| 4 | 0.8 | 51 | 3.5 | ↓ |
| 4 | 10.3 | 87 | 85.0 | ↓ |
| 4 | 13.2 | 93 | 142.0 | 2.56 |
| 2 | 10.0 | 86 | 161.0 | ↓ |
| 2 | 7.0 | 91 | 90.0 | ↓ |
| 2 | 4.0 | 79 | 43.4 | ↓ |
| 2 | 1.0 | 64 | 9.8 | ↓ |
| 2 | 7.0 | 85 | 90.0 | 2.76 |
| 6 | 4.0 | 61 | 14.2 | ↓ |
| 6 | 7.0 | 69 | 30.1 | ↓ |
| 6 | 10.0 | 79 | 54.1 | 2.90 |

C

| | | | | |
|---|---|---|---|---|
| 4 | 10.0 | 83 | 80.6 | 4.25 |
| 4 | 13.0 | 86 | 139.0 | ↓ |
| 4 | 7.0 | 71 | 45.2 | ↓ |
| 4 | 4.0 | 65 | 21.3 | ↓ |
| 4 | 1.0 | 50 | 4.4 | 4.43 |
| 2 | 10.0 | 87 | 161.0 | ↓ |
| 2 | 13.0 | 90 | 274.0 | ↓ |
| 2 | 7.0 | 80 | 90.0 | ↓ |
| 2 | 3.8 | 71 | 40.8 | ↓ |
| 2 | 0.7 | 57 | 6.2 | 4.57 |
| 6 | 10.0 | 71 | 54.0 | ↓ |
| 6 | 13.0 | 78 | 86.0 | ↓ |
| 6 | 7.0 | 58 | 30.1 | ↓ |
| 6 | 3.8 | 48 | 13.4 | 4.83 |

Values of other variables throughout these tests:

| | |
|---|---|
| Temperature _____________________° C__ | 760 |
| Particle size ____________________________μ__ | 104–211 |
| Residence time ________________________sec__ | 1.9 |

TABLE III.—THE EFFECT OF RESIDENCE TIME

| Residence time (sec.) | | Percent bed reacted | | Percent removal efficiency | |
|---|---|---|---|---|---|
| Test 1 | Test 2 | Test 1 | Test 2 | Test 1 | Test 2 |
| 1.9 | 1.3 | 0.41 | 0.42 | 92 | 98 |
| 1.9 | 1.3 | 0.62 | | 97 | |
| 1.9 | 1.3 | | 1.57 | | 63 |
| 1.9 | 1.3 | 1.92 | 1.85 | 68 | 60 |
| 1.9 | 1.3 | 2.24 | 2.17 | 60 | 58 |
| 1.9 | 1.3 | 2.44 | 2.56 | 62 | 57 |
| 1.9 | 1.3 | 3.05 | 3.52 | 62 | 54 |
| 1.9 | 1.3 | 4.04 | | 60 | |

Values of other variables throughout these tests:

Oxygen ______________________________ percent__ 9.0
Temperature __________________________ °C__ 760
Fuel sulphur _______________ percent by wt.__ 4.0
Particle size ____________________________ μ__ 104–211

TABLE IV —RELATIONSHIP BETWEEN REMOVAL EFFICIENCY AND DUST LOSSES

| Running time (hrs.) | Removal efficiency | Bed loss | |
|---|---|---|---|
| | | G./hr. | Percent/day |
| 0→28 | 90% falling to 63% | 2.8 | 6.7 |
| 28→65 | 66% falling to 59% | 1.0 | 2.0 |

Values of variables during this test:

Oxygen ______________________________ percent__ 8–10
Temperature __________________________ °C__ 760
Fuel sulphur _______________ percent by wt.__ 4.0
Particle size ____________________________ μ__ 104–211
Residence time ______________________ sec__ 1.9

TABLE V.—LIME

| Percent bed reacted | Percent removal efficiency at— | | | | |
|---|---|---|---|---|---|
| | 800–810 °C. | 825–835 °C. | 860–870 °C. | 880–890 °C. | 915–925 °C. |
| 1.6→4.2 | 96 | 95 | 96 | 94 | 92 |
| 9.7→12.2 | 94 | 92 | 93 | 93 | 93 |
| 23.1→25.5 | 82 | 92 | 92 | 92 | 85 |
| 25.5→28 | 72 | 79 | 84 | 81 | 74 |
| 30.8→31.4 | 53 | 58 | 64 | 64 | 51 |

Values of other variables during this test:

Oxygen ______________________________ percent__ 4.0
Fuel sulphur _______________ percent by weight__ 4.0
Particle size ____________________________ μ__ 104–211
Residence time ______________________ sec__ 1.0

TABLE VI.—OXYGEN CONTENT AND SULPHUR LOADING OF COMBUSTION GASES

| Fuel sulphur, percent by wt. | O₂ content of gases | Removal efficiency, percent | O₂/SO₂ molar ratio | Percent bed reacted |
|---|---|---|---|---|
| 2→6 | 0.5→11.0 | 96±2 | 2.7→167.0 | 6.2→8.4 |
| 2→6 | 0.5→11.0 | 95±2 | 2.1→169.0 | 18.9→21.2 |
| 4 | 10.0 | 83 | 80.6 | 25±5 |
| 4 | 7.0 | 85 | 45.2 | ↓ |
| 4 | 4.0 | 79 | 21.3 | ↓ |
| 4 | 1.1 | 73 | 5.1 | ↓ |
| 2 | 10.0 | 87 | 161.0 | 26.0 |
| 2 | 7.0 | 84 | 89.7 | ↓ |
| 2 | 4.3 | 83 | 47.2 | ↓ |
| 2 | 0.8 | 75 | 7.4 | ↓ |
| 6 | 10.0 | 84 | 54.4 | 26.6 |
| 6 | 6.7 | 77 | 27.4 | ↓ |
| 6 | 4.0 | 71 | 14.4 | ↓ |
| 4 | 9.5 | 86 | 73.1 | 31.6 |
| 4 | 4.6 | 77 | 25.6 | ↓ |
| 4 | 1.8 | 69 | 8.7 | ↓ |
| 2 | 10.4 | 89 | 173.6 | 32.7 |
| 2 | 6.6 | 86 | 83.6 | ↓ |
| 2 | 0.9 | 70 | 8.3 | ↓ |
| 6 | 10.8 | 84 | 62.1 | 32.9 |
| 6 | 6.4 | 77 | 26.5 | ↓ |
| 6 | 3.7 | 74 | 13.1 | ↓ |
| 6 | 1.1 | 70 | 3.4 | ↓ |

Values of other variables throughout these tests:

Temperature __________________________ °C__ 865
Particle size ____________________________ μ__ 104–211
Residence time ______________________ sec__ 1.0

Although, in the foregoing experiments, the fuel was burned outside the fluidized bed, further experimentation has shown that comparable results are obtained when the fuel is burned in the bed.

It has been found that the smaller the particle size of the fluidized bed material the more effective is the removal of sulphur from sulphur containing fuel burned in the fluidized bed boiler; thus particles within the size range used in the experiments repeated in the foregoing table, i.e. 104–211μ, are significantly more effective than are particles of e.g., 800μ. On the other hand it is undesirable to reduce the particle size to the stage where dust formation becomes a nuisance.

What is claimed is:

1. A process for treatment of a sulfur-containing material to produce a substantially sulfur-free flue gas comprising:

(a) introducing said sulfur-containing material into a desulfurizing reaction zone containing a bed of fluidized particles comprising at least one sulfur-fixing material of the group consisting of calcium oxide and magnesium oxide, the sulfur-fixing material being present in the reaction zone in substantial excess of the stoichiometric amount for combining with the sulfur in the sulfur-containing material and the temperature in the reaction zone being in the range of about 800° to about 1100° C., and reacting said sulfur-containing material with oxygen and with said sulfur-fixing material under oxidizing conditions whereby sulfur is fixed in the sulfur-fixing material in the bed as calcium sulfate and/or magnesium sulfate with the formation of a substantially sulfur-free flue gas;

(b) discharging the substantially sulfur-free flue gas from the reaction zone and transferring hot particles comprising calcium sulfate and/or magnesium sulfate and unreacted calcium oxide and/or magnesium oxide from said reaction zone to a regeneration zone;

(c) passing a fluidizing gas into the regeneration zone to fluidize the particles therein, and maintaining reducing conditions within the regeneration zone, thereby converting at least some of the sulfate in the particles to the corresponding oxide;

(d) withdrawing gases and vapors comprising liberated sulfur moieties from the regeneration zone; and (e) causing hot particles comprising regenerated calcium oxide and/or magnesium oxide to pass from said regeneration zone to said reaction zone at substantially the same rate as the rate at which particles pass from the reaction zone to the regeneration zone, the rate of passage of particles from the regeneration zone to the reaction zone being such that the amount of sulfur-fixing material in the reaction zone in which sulfur is fixed is a minor proportion of the total sulfur-fixing material in the reaction zone.

2. A process according to claim 1 in which the reducing conditions in step (c) are maintained by passing of fuel into contact with the fluidized particles in the regeneration zone and partially burning the fuel in the presence of the fluidized particles with a substoichiometric quantity of oxygen, the oxygen being provided in said fluidizing gas.

3. A process according to claim 2 in which the fuel is a sulfur-containing fuel.

4. A process according to claim 3 in which the sulfur-containing fuel employed in the regeneration zone has the same composition as at least some of the sulfur-containing material introduced into the reaction zone.

5. A process according to claim 1 in which gases and vapors leaving the regeneration zone are cooled and a condensable material therein is recovered.

6. A process according to claim 1 in which at least some of the sulfur moieties are removed from the gases and vapors leaving the regeneration zone and at least part of the remaining gases and vapors are recirculated to the reaction zone.

7. A process according to claim 1 in which said sulfur-containing material is a combustible sulfur-containing material.

8. A process according to claim 7 in which the combustible sulfur-containing material is a sulfur-containing hydrocarbonaceous material.

9. A process according to claim 1 in which the sulfur-containing material is a combustible gas obtained by heat treatment of sulfur-containing hydrocarbonaceous material in an oxygen deficient atmosphere.

10. A process according to claim 1 in which said sulfur-containing material is a gas containing sulfur dioxide.

References Cited

UNITED STATES PATENTS

| | | | |
|---|---|---|---|
| 2,928,718 | 3/1960 | Berglund et al. | 423—555 X |
| 3,168,386 | 2/1965 | Mositz et al. | 48—212 |
| 3,475,121 | 10/1969 | Thornton | 23—2 S |
| 3,524,720 | 8/1970 | Bauer | 23—2 S |
| 2,718,453 | 9/1955 | Beckman | 23—2 S |
| 3,579,296 | 5/1971 | Cann | 23—178 |
| 3,087,790 | 4/1963 | Wheelock | 23—178 X |
| 2,992,884 | 7/1961 | Bienstock et al. | 23—2 S |

FOREIGN PATENTS

| | | | |
|---|---|---|---|
| 435,560 | 9/1935 | Great Britain | 23—2 S |

OTHER REFERENCES

Squires, A.: "Chemical Engineering," Nov. 20, 1967, pp. 133–37.

GEORGE O. PETERS, Primary Examiner

U.S. Cl. X.R.

48—92, 212